US005537573A

United States Patent [19]

Ware et al.

[11] Patent Number: 5,537,573

[45] Date of Patent: Jul. 16, 1996

[54] CACHE SYSTEM AND METHOD FOR PREFETCHING OF DATA

[75] Inventors: Frederick A. Ware, Los Altos Hills; Michael P. Farmwald, Portola Valley; Craig Hampel; Karnamadakala Krishnamohan, both of San Jose, all of Calif.

[73] Assignee: Rambus, Inc., Mountain View, Calif.

[21] Appl. No.: 69,147

[22] Filed: May 28, 1993

[51] Int. Cl.[6] ..................... G06F 12/00

[52] U.S. Cl. .............. 395/464; 395/421.03; 364/DIG. 1; 364/263.1

[58] Field of Search .................... 395/400, 425, 395/250, 444, 445, 464, 421.03

[56] References Cited

U.S. PATENT DOCUMENTS

| | | | |
|---|---|---|---|
| 4,807,110 | 2/1989 | Pomerene et al. | 395/425 |
| 4,943,908 | 7/1990 | Emma et al. | 395/425 |
| 4,980,823 | 12/1990 | Liu | 395/425 |
| 5,136,697 | 8/1992 | Johnson | 395/375 |
| 5,305,389 | 4/1994 | Palmer | 395/425 |

FOREIGN PATENT DOCUMENTS

| | | | |
|---|---|---|---|
| 0157175 | 10/1985 | European Pat. Off. | G06F 12/08 |
| 0242595 | 10/1987 | European Pat. Off. | G06F 11/10 |
| 0296430 | 12/1988 | European Pat. Off. | G06F 12/08 |

OTHER PUBLICATIONS

IBM Technical Disclosure Bulletin, "History Overflow Mechanism", L. Liu, J. Pomerene, T. R. Puzak, R. N. Rechtschaffen, P. Rosenfeld, F. Sparacio and J. Voldman, vol. 27, No. 5, pp. 3001–3002, Oct. 1984.

IBM Technical Disclosure Bulletin, "Adaptive Data Staging Mechanism in a Virtual Storage System", N. R. Clark and N. K. Ouchi, vol. 17, No. 1, pp. 210–214, Jun. 1974.

IBM Technical Disclosure Bulletin, "Simple Prefetching Scheme for Memory Hierarchy", K. So, vol. 26, No. 1, pp. 52–54, Jun. 1983.

Grimsrud, Knut S., "Multiple Prefetch Adaptive Disk Caching", IEEE Trans. on Knowledge and Data Eng, vol. 5, No. 1, Feb. 1993 pp. 88–103.

*Primary Examiner*—Rebecca L. Rudolph

*Attorney, Agent, or Firm*—Blakely, Sokoloff, Taylor and Zafman

[57] ABSTRACT

A cache system which includes prefetch pointer fields for identifying lines of memory to prefetch thereby minimizing the occurrence of cache misses. This cache structure and method for implementing the same takes advantage of the previous execution history of the processor and the locality of reference exhibited by the requested addresses. In particular, each cache line contains a prefetch pointer field which contains a pointer to a line in memory to be prefetched and placed in the cache. By prefetching specified lines of data with temporal locality to the lines of data containing the prefetch pointers the number of cache misses is minimized.

80 Claims, 13 Drawing Sheets

```
R2(ReqAddr[A:L], ReqData[S-1:0][8:0])
{
INDEXA = UnsignedValue(ReqAddr[L+C-1:L]);        /* Generate Index into cache*/
PointerA = UnsignedValue(ReqAddr[A:L]);          /* Generate pointer into main memory*/
if ((Addr[A:L+C]==Tag[IndexA][A:L+C]) &&
        (Valid[IndexA]==TRUE)) then              /* Check if requested block is in cache*/
        {
         ReqData[S-1:0][8:0]=Data[IndexA][S-1:0][8:0];   /*If hit, return data*/
        }
else
        {
        ReqData[S-1:0][8:0]=Memory[PointerA][S-1:0][8:0]; /*if miss, get data from memory (R3)*/
        Data[IndexA][S-1:0][8:0]=ReqData[S-1:0][8:0];     /*put data into cache*/
        Tag[IndexA]=ReqAddr[A:C];                         /*update tag field*/
        Valid[IndexA]=TRUE;                               /*update valid field*/
        }
}
```

*Figure 4a*

```
W2(ReqAddr[A:L], ReqData[S-1:0][8:0])
{
IndexA = UnsignedValue(ReqAddr[L+C-1:L]);             /* Generate index into cache */
PointerA = UnsignedValue(ReqAddr[A:L]);               /* Generate pointer into main memory */
Memory[PointerA][S-1:0][8:0] = ReqData[S-1:0][8:0];   /* put data into main memory (W3) */
If ((Addr[A:L+C] == Tag[IndexA][A:L+C]) &&
        (Valid[IndexA] == TRUE)) then                 /* Check if requested block is in cache */
        {
        Data[IndexA][S-1:0][8:0] = ReqData[S-1:0][8:0];   /* If hit, put data in cache */
        }                                                 /* if miss, do nothing */
}
```

*Figure 4b*

```
R2(ReqAddr[A:L], ReqData[S-1:0][8:0])
{
IndexA = UnsignedValue(ReqAddr[L+C-1:L]);                /* Generate index into cache */
if ((ReqAddr[A:L+C] == Tag[IndexA][A:L+C]) &&
        (Valid[IndexA] == TRUE)) then                    /* Check if requested line is in cache */
        {
        ReqData[S-1:0][8:0] = Data[IndexA][S-1:0][8:0];  /* If hit, return data */
        T1[A:L] = Pointer[IndexA][A:L];                  /* Put Pointer field into T1 */
        }
else
        {
        PointerA = UnsignedValue(ReqAddr[A:L]);
        ReqData[S-1:0][7:0] = Memory[PointerA][S-1:0][7:0];   /* if miss, get data from memory (R3) */
        ReqData[S-1:0][8] = ByteParity(ReqData[S-1:0][7:0]);  /* Generate byte parity */
        T1[A:L] = Memory[PointerA][A:L][8];                   /* Put Pointer field into T1 */
```

*Figure 10a*

```
if (UnsignedValue(Count[C-1:0]) <= 2^(C-1)) then        /* Check Null counter */
        {
        T2[A:L] = Null[A:L];                            /* Put pointer to last NULL line into T2 */
        Count[C-1:0] = 11...1;                          /* Set Null counter to maximum */
        }
else
        {
        T2[A:L] = Last[A:L];                            /* Put pointer to Last line into T2 */
        }
Pointer2 =UnsignedValue(T2[A:L]);                       /* Generate pointer into memory */
Memory[Pointer2][A:L][8] = ReqAddr[A:L]                 /* Update pointer field in memory (W3) */
}
```

*Figure 10b*

```
Index1 =UnsignedValue(T1[L+C-1:L]);                              /* Generate index into cache */
Pointer1 = UnsignedValue(T1[A:L]);                               /* Generate pointer into memory */
Valid = TRUE;
Tag[Index1][A:L+C] = T1[A:L+C];                                  /* Update cache tag with T1 pointer */
Pointer[Index1][A:L] = Memory[Pointer1][A:L][8];                 /* Update pointer field from mem (R3) */
Data[Index1][S-1:0][7:0] = Memory[Pointer1][S-1:0][7:0];         /* Update data field from memory line
Data[Index1][S-1:0][8] = ByteParity(Data[Index1][S-1:0][7:0]);   /* Generate byte parity */

Last[A:L] = ReqAddr[A:L];                                        /* Update pointer to Last line */
if (Pointer[Index][A:L] == NULL) then                            /* Check if pointer field is NULL */
          {
          Null[A:L] = T1[A:L];                                   /* If so, update pointer to last Null line */
          Count[C-1:0] = 00...0;                                 /* and clear Null counter */
          }
else
          {
          if (UnsignedValue(Count[C-1:0]) < 2^(C-1)) then        /* Check null counter */
                    {
                    Count[C-1:0] = Increment(Count[C-1:0]);      /* If it is not, increment it */
                    }
          }
}
```

*Figure 10c*

```
W2(ReqAddr[A:L], ReqData[S-1:0][8:0])
{
IndexA = ReqAddr[L+C-1:L];                              /* Generate index into cache */
PointerA = ReqAddr[A:L]                                 /* Generate pointer into memory */

Memory[PointerA][S-1:0][7:0] = ReqData[S-1:0][7:0];     /* Put write data into memory (W3) */
Memory[PointerA][A:L][8] = NULL;                        /* Put NULL into the pointer field */
Memory[PointerA][S-1:A+1,L-1:0][8] =
        WordParity(ReqData[S-1:0][7:0]);                /* Put word parity into memory*/

if ((ReqAddr[A:L+C] == Tag[IndexA][A:L+C]) &&
        (Valid[IndexA] == TRUE)) then                   /* Check if requested block is in cache */
        {
        Data[IndexA][S-1:0][8:0] = ReqData[S-1:0][8:0]; /* If hit, put data in cache*/
        Pointer[IndexA][A:L] = NULL;                    /* Put NULL into pointer field */
        }
}
```

*Figure 11*

CACHE SYSTEM AND METHOD FOR PREFETCHING OF DATA

BACKGROUND OF THE INVENTION

1. Field of the Invention

The present invention relates to the cache memory systems. More particularly, the present invention relates to a cache memory system which performs prefetching of data from memory based upon pointers in the cache.

2. Art Background

Dynamic Random Access Memory (DRAM) components provide an inexpensive form of solid-state storage for computer systems. However, the speed of DRAM components is typically slower than the processors which access the DRAM. A common technique for lessening the impact of slow DRAM access time (the DRAM latency) on the processor's performance is to employ a cache memory. A cache memory is typically much smaller than the main DRAM memory, but much faster. It's speed is well matched to the processor speed. A cache is typically implemented with Static Random Access Memory (SRAM) components, which store blocks of instructions and data (referred to as lines of data), that are copies of selected main memory locations. Because a cache memory is smaller than the main memory from which it copies data, the cache is not fully addressable and stores an address tag field for each data field. This tag field identifies the main memory address corresponding to a particular data line.

FIG. 1 shows a processor with a level one (L1) cache located between the DRAM and main memory. When a read request, R1, cannot be satisfied by the cache, a cache miss occurs and the cache must make a read request, R2, to the main memory. Likewise, for example in a write allocate policy, when a write request W1 can not be satisfied by the cache, a miss occurs and the cache must make a read request R2 to the main memory.

A read request affects a processor's performance more directly than a write request. This is because a processor must usually stall (wait) until the read data it has requested is returned before continuing execution. When a processor makes a write request, the address and data can typically be written into temporary buffers while the processor continues execution.

Write requests can be serviced using techniques such as write through and write back. Using the write through technique, the data line in main memory is always updated with the write data, and the copy in the cache is updated only if it is present in the cache. Using the write back technique, the copy in the cache is updated only if the line of data is present in the cache. If the line of data is not present in the cache, then the data must first be read in, and then updated. Using this technique, some lines in main memory will be incorrect. To track the lines in main memory which hold incorrect data because the line in main memory has not been updated, dirty bits associated with each line are used.

Modern processor components typically include an L1 cache. However, referring to FIG. 2, the resulting processor-L1 structure can still benefit from a second level (L2) cache which satisfies some portion of the read and write requests (R2 and W2) directed to main memory. FIG. 3 is an exemplary illustration of the structure of an L2 cache. The illustration utilizes the following variables:

L—The number of address bits needed to access a byte in a cache line $S=2^L$—The number of bytes in a cache line A—Main memory contains $2^{A+L-L}$ lines (address bits A:L access a line).

C—The number of address bits needed to access a cache line in the cache $2^C$—The number of cache lines in the cache Valid[$2^C$—1:0]—A value of TRUE means the cache line holds a correct copy of the main memory line. A value of FALSE means it does not.

Tag[$2^C$—1:0][A:L+C]—The value of the Address[A:L+C] bits of the memory line if the cache line is valid.

Data[$2^C$—1:0][S—1:0][8:0]—The value of the cache line.

ReqAddr[A:L]—The address of a memory line requested by the processor

ReqData[S—1:0][8:0]—The memory line that is read or written.

Memory[$2^{A+1-L}$—1:0][S—1:0][8:0]—Main memory organized by [memory lines][bytes][bits].

FIGS. 4*a* and 4*b* are exemplary pseudo code which show how the above cache and memory structures are manipulated during an R2 read request or a W2 write request. Referring to FIG. 4*a* , an index into the cache (IndexA) is generated by taking the unsigned integer value of a C-bit field in the ReqAddr field using the UnsignedValue( ) routine. Similarly, a pointer into memory (PointerA) is generated. The rest of the ReqAddr field is then compared to the Tag field located at IndexA of the cache. If there is a match, and the Valid field at IndexA is set to TRUE, then a cache hit has occurred and the ReqData parameter is set to the Data field located at IndexA. If there is a cache miss, then a memory read (R3) is performed to get the requested data from main memory. The ReqData parameter is set to this data, as is the Data field at IndexA of the cache. The Tag and Valid fields are also updated.

Referring to FIG. 4*b*, the write routine, the IndexA and PointerA unsigned integers are generated as in the read routine from the ReqAddr parameter. The ReqData parameter is written (W3) into main memory at the PointerA line address. If this line is present in the cache at IndexA, then the Data field is also set to ReqData.

SUMMARY OF THE INVENTION

It is therefore an object of the present invention to provide a cache memory system in which lines of data are prefetched from memory prior to requests for access wherein the line prefetched is selected based upon the prior execution history of the processor.

It is an object of the present invention to provide a cache system and method for prefetching data from memory which results in a high cache hit rate and low latency.

The present invention provides an innovative cache structure and method for utilizing the same which increases the cache hit rate by prefetching lines from main memory based on the prior history of lines accessed. In particular, each cache line is associated with a pointer field which points to the line to be prefetched. Space for this pointer field can be established in a number of ways. In one embodiment, the pointer field is held in a region of main memory not used for the normal code and data structures for executing processes.

In the preferred embodiment, space in main memory is not impacted while maintaining pointer information for the prefetching in the cache. In particular, the parity bits associated with each byte in the line of memory are in part used to store pointer information. Thus, when subsequent accesses are performed to main memory, pointer information identifying the line of memory to prefetch is provided to enhance the efficiency of the cache.

The pointer information is updated whenever the cache misses, so the probability of a hit on a subsequent request to the same line is increased.

BRIEF DESCRIPTION OF THE DRAWINGS

The objects, features and advantages of the present invention will be apparent to one skilled in the art from the following detailed description in which:

FIGS. 4*a* and 4*b* provide exemplary pseudo code for prior art read and write procedures using a cache.

FIGS. 10*a*, 10*b* and 10*c* set forth pseudo code illustrating one embodiment of the read present the cache system of the present invention.

FIG. 11 is exemplary pseudo code illustrating one embodiment of the write process in the cache system of the present invention.

DETAILED DESCRIPTION OF THE INVENTION

In the following description, for purposes of explanation, numerous details are set forth, such as byte and word sizes, in order to provide a thorough understanding of the present invention. However, it will be apparent to one skilled in the art that these specific details are not required in order to practice the invention. In other instances, well known electrical structures and circuits are shown in block diagram form in order not to obscure the present invention unnecessarily.

The structure and methods of the present invention are described in the form of a direct mapped, write through cache. This invention will be described with reference to the write through policy because of its simplicity. However, the write policy chosen is independent of the innovation that is disclosed in this document and it is readily apparent that extension to caches using write back policies is straightforward to someone skilled in the art.

Likewise, there are different methods of organizing caches: Direct-mapped, two (or more) -way set associative, and fully associative. These cache organizations affect the number of places in the cache where a particular line from memory may be placed. The present invention will be described in terms of the direct-mapped policy. However, the associativity policy chosen is independent of the innovation that disclosed herein and extensions to caches with set-associative or fully-associative policies is straightforward to someone skilled in the art.

Caches are effective because the pattern of address requests for an application shows a spatial and temporal locality. Spatial locality implies that if an address A is requested, there is a high probability that address (A+a) will also be requested. Temporal locality implies that if an address A is requested at time T, there is a high probability that address A will also be requested at a time (T+t). The probability increases as "a" and "t" are made smaller. A cache takes advantage of this locality by fetching a line of information whenever any portion of that line is requested by the processor (a line is typically four to eight times bigger than the data "word" which the processor operates on). This means that the information at nearby addresses will be "prefetched", that is, the information will already be present in the cache when requested.

Figure 1:
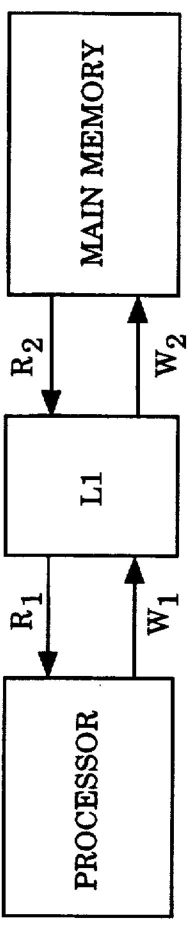
FIG. 1 is a prior art block diagram of a cache memory system.
Figure 2:
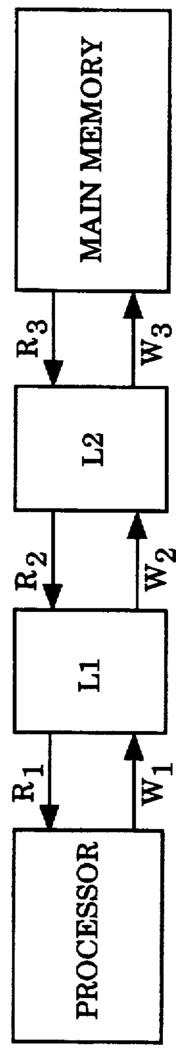
FIG. 2 is a prior art block diagram of a two level cache memory system.
Figure 3:
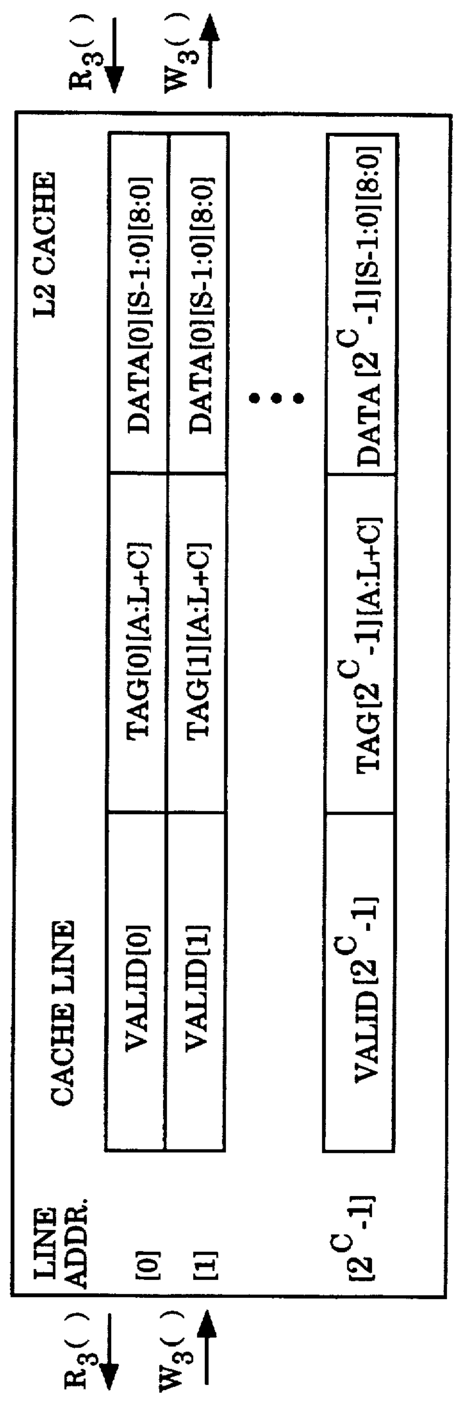
FIG. 3 is a prior art illustration of an exemplary structure of a cache.
Figure 5A:
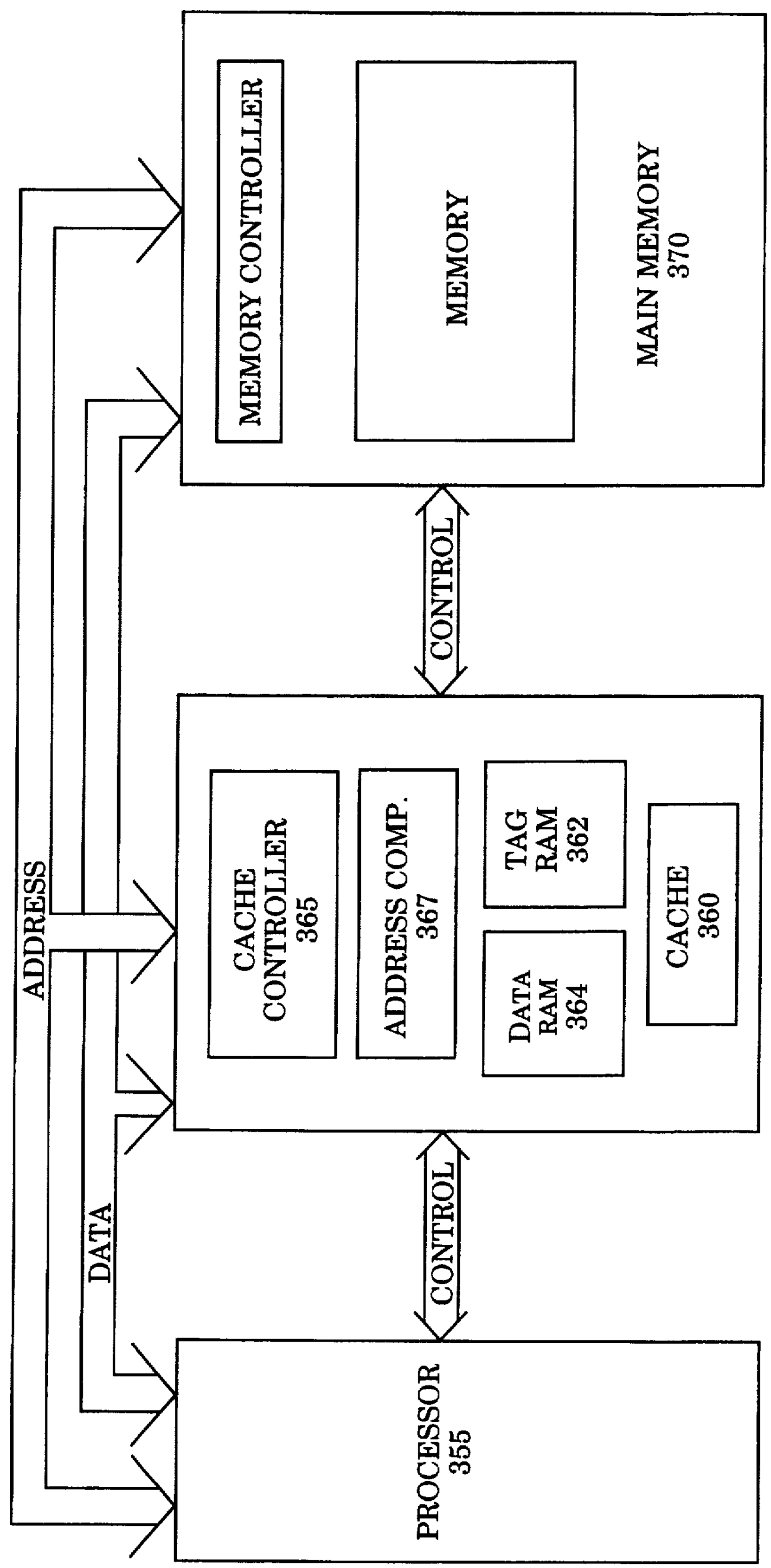
FIGS. 5*a* and 5*b* are exemplary block diagrams of the cache memory system of the present invention.
Figure 5B:
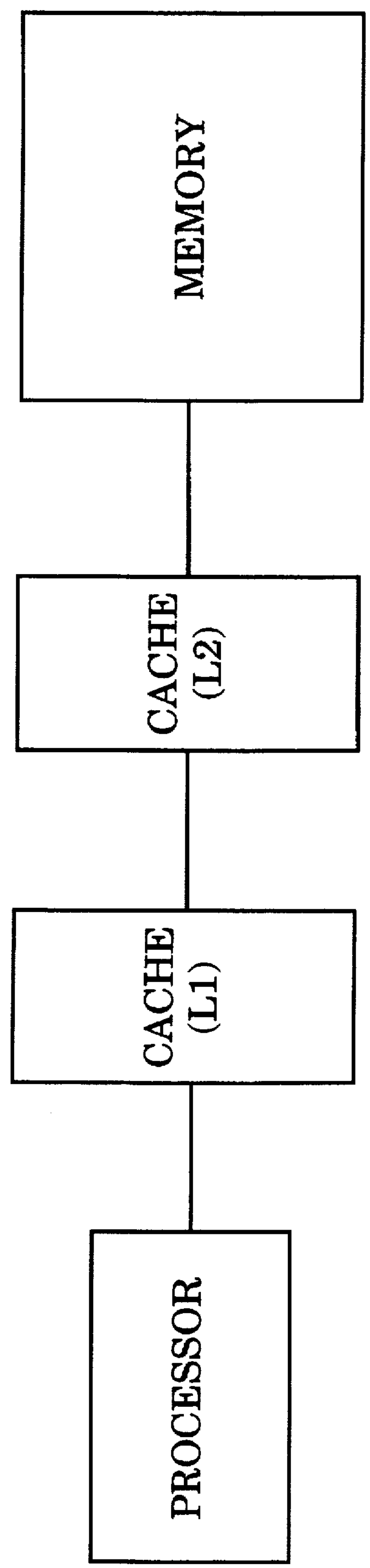

Exemplary block diagrams of a cache system are shown in FIGS. 5*a* and 5*b*. Referring to FIG. 5*a*, a typical system will include a processor 355 which issues requests to access data located at a specified address in memory. This request is received by the cache 360 which determines, by comparing the requested address with the tags located in the tag RAM 362, whether the data is located in the cache RAM 364. The cache controller 365 and address comparator 367 provide the logic to perform the comparison and provide the data back to the processor 355 if a cache hit occurs and the data is located in the cache. The cache controller 365 also provides the logic necessary to perform the prefetching in accordance with the teachings of the present invention. Main memory 370 provides the data to the processor 355 if a cache miss occurs. The line of data requested is also written to the cache 360 so that the data is readily available if data within the line of memory is subsequently requested. This structure is exemplary; it is apparent that other cache structures can be implemented which incorporate the teachings of the present invention.

FIG. 5*b* illustrates the use of a two level cache to speed up the time required by the processor to access data. Preferably, the first level cache functions as in the prior art and the second level cache functions in accordance with the teachings of the present invention; however other embodiments are contemplated. The cache structure and method for accessing will be discussed with reference to the second level cache L2; however, it is readily apparent that the structures and methods described herein can be applied to different level caches including a single level cache.

As noted earlier, blindly prefetching information ahead of every requested address uses up main memory bandwidth with only a limited return in performance. It is better to take advantage of the previous execution history of the processor and the locality of reference exhibited by the requested addresses to create and maintain a pointer array within main memory and to perform prefetching of data based upon the addresses identified by the pointers.

In the present example consisting of a 32 Mbyte main memory using 32 byte lines, there is room for 3 MBytes of pointers. If this information resource is used effectively, it can provide the performance levels of a very large cache implemented with discrete SRAM devices without significant degradation of error control. The system of the present invention is able to do this with a very small cache because it is able to reduce the compulsory and capacity miss rate of an application. A traditional cache suffers a compulsory miss the first time a memory line is requested. A cache also suffers a capacity miss if that line is discarded by the cache because too many other requests have occurred before the line is reused.

The pointer array, once established, gives the cache the ability to prefetch a memory line before it is requested, and avoid some compulsory misses altogether, something that a traditional cache can not. The pointer array also permits many capacity misses to be avoided without increasing the cache to a large size. This is possible because it does not require that a memory line reside in the cache between the occurrences or requests for that line. Instead, the line is discarded, and is prefetched again when the pattern of request addresses include a memory line with the appropriate pointer to the line.

This prefetching scheme does require extra bandwidth between the cache and main memory, compared to a traditional cache. The extra transfers between the cache and main memory tend to occur during the time the cache is transferring a requested line to the processor, so a significant performance loss is not realized. In any case, it is relatively easy to increase the bandwidth of main memory, for example, by increasing the width of the buses to the main memory components. The benefit is a reduction in the size and cost of the cache.

In the present invention, the second level cache, L2, is configured with $2^L$=S bytes per cache line and $2^C$ cache lines per cache. Each cache line includes one additional field:

Pointer[$2^C$—1:0][A:L]—A pointer to a memory line which is likely to be used soon after this line.

Furthermore, three registers are located in the cache:

Count[C—1:0]—a register which keeps track of how many cache accesses have occurred since an access to a line with a Null pointer field.

Null[A:L]—a register which points to the last line accessed with a null pointer field.

Last[A:L]—a register which points to the last line accessed in the cache.

Figure 6:
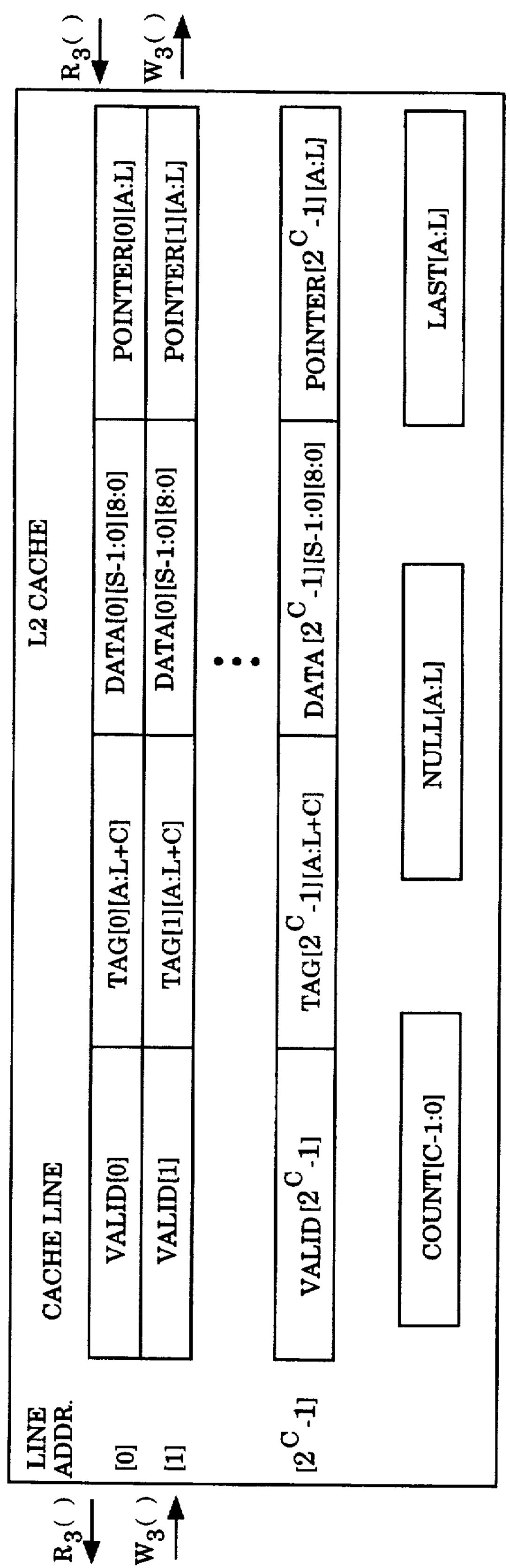
FIG. 6 is a exemplary diagram of a cache structure utilized in one embodiment of the present invention.

An exemplary structure of a cache is shown in FIG. 6. Preferably, the pointer field in the cache line originates from a pointer array that is maintained in main memory. There is a pointer field associated with each memory line, which points to another memory line which is likely to be used shortly after the current line is used. Alternately, the pointer may be maintained solely in the cache such that when a new line of memory is transferred to the cache, the pointer field will be initialized to a null value and subsequently updated with pointer identifying the next line accessed.

When the processor requests a memory line at address X, the cache or main memory supplies the data at memory location X. The cache also prefetches the memory line at address Y, wherein Y is the address identified by the pointer field of the line of memory at location X, and places it in the cache. If the processor later requests the memory line at address Y, it is likely to be in the cache thereby increasing the cache hit rate.

In the preferred embodiment, the pointer array is maintained in accordance with the access performed. Thus, if a cache miss occurs, the pointer field in a memory line which was previously accessed is changed so that a future miss at that address can be avoided. It is not necessary, however, that the pointer Y for a line of memory at address Y be in the line that was last accessed. As long as the pointer Y is placed in the pointer field of a line memory at address X which was accessed within the last $2^{C-1}$ requests, then it is probable that the line will still be in the cache when subsequently requested.

In order to maintain the pointers outside the cache to further increase the cache hit rate, the pointer information is also maintained in main memory. One way to provide sufficient memory space for the pointer information is to restrict a portion of physical memory (e.g., at the top addresses) from operating system usage, and use it to store the pointer array. For example, using a 16 bit relative pointer (the pointer may only specify addresses within $2^{15}$ lines of the memory line it is stored in) and with 32 byte lines (L=5), the pointer array will use 1/16th of the memory. Besides reducing the effective size of main memory, this technique has the disadvantage that two areas of memory must be accessed for every memory request, thereby increasing the latency for accessing main memory.

Alternately, it is preferred that the pointer be maintained within each line of memory. In the present embodiment, an innovative method and structure is used to store the pointer information. If the memory is implemented with byte parity, the parity bit associated with each word is used to store the pointer information, preferably in addition to the error correction and detection information. For example, for eight bit bytes with one bit for parity, the ninth parity bit is used to hold the pointer field and an EDC (Error Detection and Correction) field. As each line of memory contains multiple bytes, in the present example, 32 bytes, enough bits are available to store the pointer information. Preferably, the EDC field uses word parity or Hamming correction on the memory line, thus freeing up about ¾ of the ninth bits in the memory line.

Figure 7:
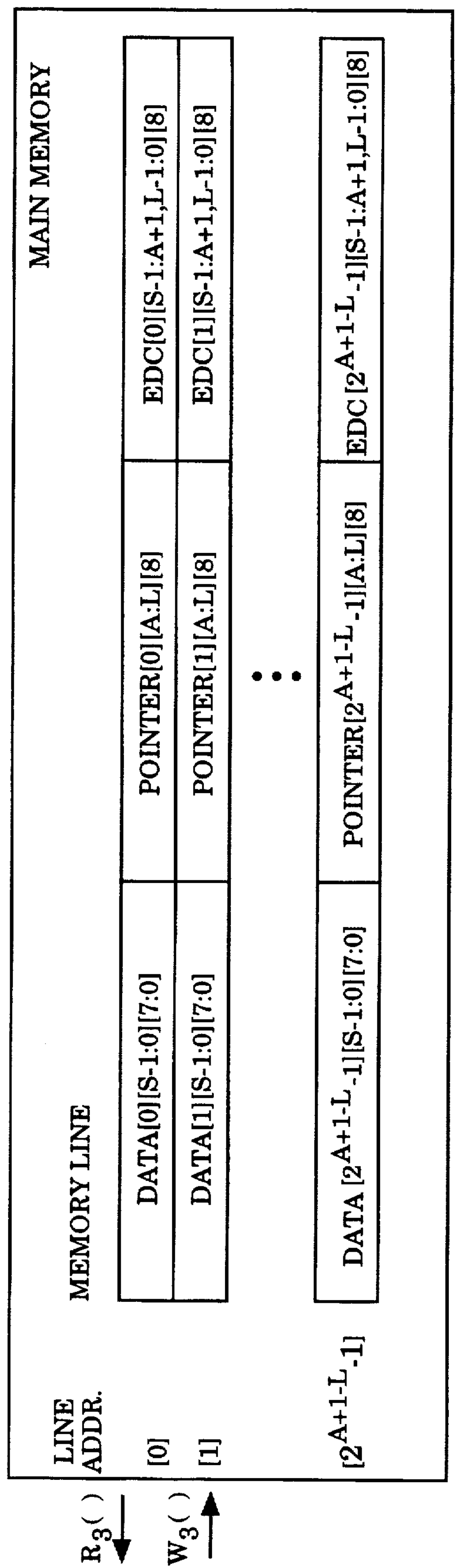
FIG. 7 is an exemplary diagram of the memory structure utilized in one embodiment of the present invention.

FIG. 7 illustrates an exemplary structure of the memory lines containing multiple bytes of data and the pointer and EDC fields. It should be noted that the [A:L] field of the ninth bit forms the pointer, and the remaining bits [S—1:A+1, L—1:0] are used for the EDC field. This allocation is arbitrary, and can easily be rearranged if other implementation advantages are realized.

Figure 8:
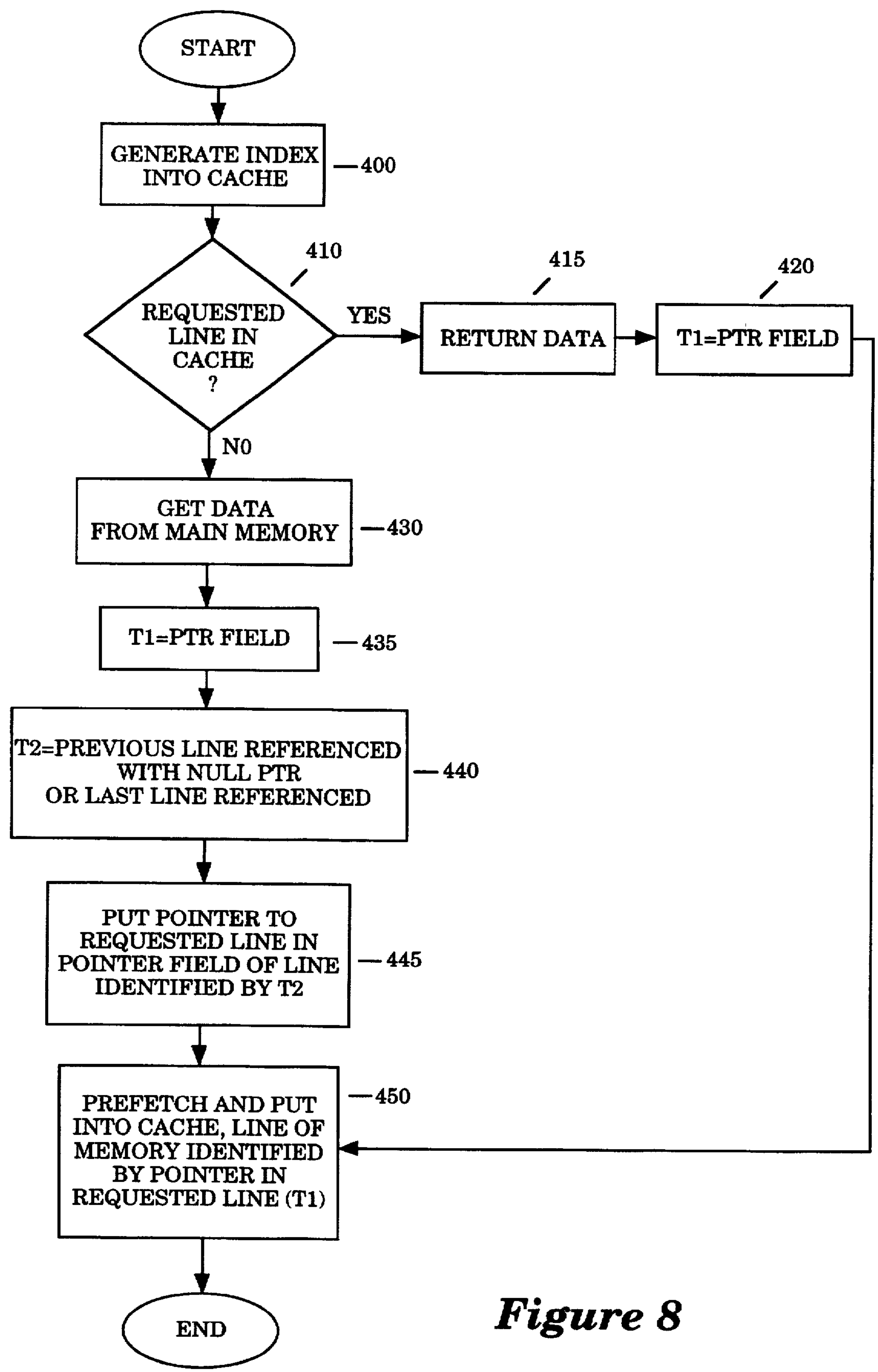
FIG. 8 is a flowchart diagram illustrating one embodiment of the method for prefetching in the cache system of the present invention.

A generalized process for accessing the cache memory system will be described with reference to FIG. 8. At step 400, an index into the cache is generated. If, at step 410, the requested line is in the cache, at step 415 the data is returned to the processor, and at step 420, the pointer field of the line returned is temporarily saved. If the requested data is not located in the cache, the line is retrieved from main memory, step 430, and the pointer field is temporarily saved, step 435. At step 440, the previous line referenced which contained a null pointer or the last line referenced is identified. As a cache miss occurred because the line of data was not prefetched and placed in the cache, at step 445 a pointer of a recently accessed line is updated in main memory with a pointer identifying the line just referenced. In addition, the pointer of the line in the cache may also be updated. Preferably, a recently accessed line with a null pointer field is updated with the pointer to the referenced line. The line does not have to be the last line accessed; so long as it is within the range corresponding to a predetermined number of lines of the cache, the likelihood that the line will be subsequently prefetched is increased. If a recently accessed line with a null pointer within the predetermined number of lines last accessed is not found, the last line previously accessed is updated with the pointer to the referenced line just accessed.

At step 450, the prefetch process is executed. The pointer temporarily saved, (step 435 or step 420) is now used to determine the line of memory to retrieve and place in the cache. A variety of replacement algorithms can be used to identify the line of the cache to be replaced. For example, the line of the cache which has not been accessed for the longest period of time can be replaced with the prefetched line. Alternately, after a predetermined amount of time or after a predetermined number of accesses have occurred, lines of the cache can be automatically deleted to provide space for storage of prefetched lines from memory. Of course, if the line of data identified by the pointer is already located in the cache, the line is not retrieved from memory as it is already available for access by the processor.

Figure 9:
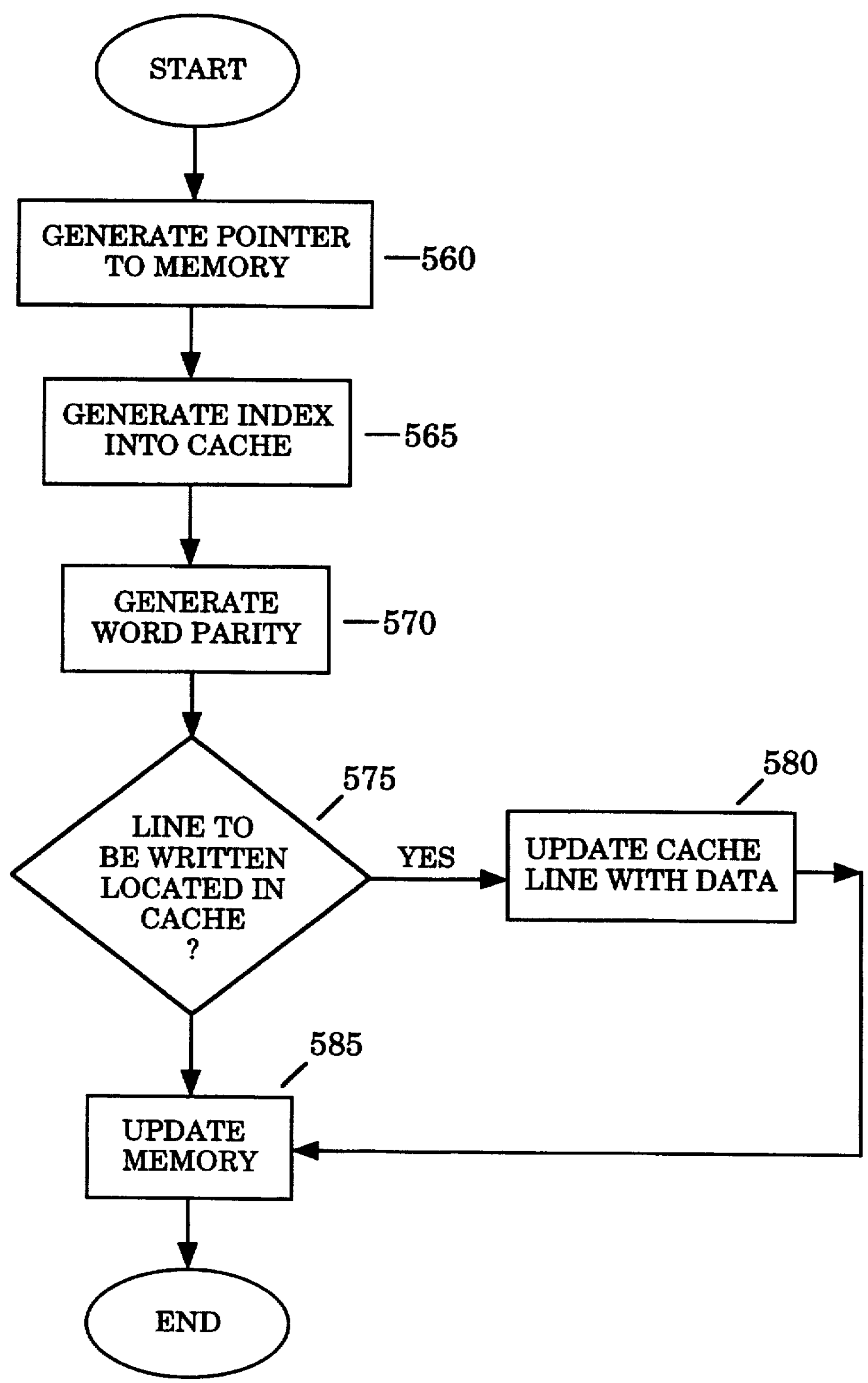
FIG. 9 is a flow chart diagram illustrating one embodiment for performing a write operation.

An exemplary write operation is illustrated by the flow chart of FIG. 9. The process described implements a cache write through policy; however, other policies can easily be implemented. At step 560, the address into memory which identifies the line of memory to be written is generated and at step 565 the corresponding index into the cache is generated. The parity is then generated for storage with the line of data in memory. If, at step 575, the line of data is also located in the cache, the cache is updated, step 580. The memory is then updated at the location identified by the pointer, step 585.

Alternately, if the line of data is also located in the cache, the line in the cache can be marked invalid, for example, through use of an invalid bit associated with each line of the cache. In the embodiment discussed, the pointer field is maintained through the write operation. This can be achieved, for example, by masking the bits of the pointer such that they are not over written. Alternately, the pointer field can be reset to a Null value.

FIGS. 10*a*–10*c* and 11 illustrate a specific embodiment of the process of the present invention. Referring to FIGS. 10*a*–10*c*, the read routine begins by checking if the requested memory line is in the cache and is valid. If so, the instruction or data is returned and the T1 variable is set to the pointer field in that line. If a cache miss occurs, the requested line is read from memory and returned to the processor. The pointer field from this memory line is then placed in the T1 variable. Byte parity is generated for the line retrieved from memory, because each line includes word (four-byte) parity while resident in memory. The unused 3*S/4 "ninth" bits of the S-byte line are used to store the (A–L+1) bit pointer for prefetching. Therefore, whenever a line of data is read from memory, the word parity of the line is checked.

Alternatively, error correction code (ECC) can be used instead of word parity for each S-byte line. However, ECC requires ($6+\log_2 S$) bits. Therefore, fewer bits may be left available for the pointer field and for optional pointer parity. In this situation, the pointer might need to be expressed as a two's complement displacement relative to the address of the memory line it resides in to minimize the number of bits required. Analysis has shown that in the applications studied, fewer than 0.01% of the pointer values need a relative displacement greater than $\pm 2^{19}$. A 20 bit pointer field would thus not impact the performance significantly, and would require a 20 bit adder in the L cache for computing absolute addresses.

It should be noted that the cache structure shown in FIG. 6 does not include a parity/EDC field for each line stored in the cache. By eliminating the field, the amount of memory is reduced. The data is not compromised as it has been shown that most errors occur when accessing the main memory and not the cache. Reference to the FIGS. 10*a*–10*c* shows that the byte parity is generated during read and write operations to the main memory. However, it is readily apparent that the parity/ECC information can be included in the cache by adding a field to each line of data and expanding the size of the cache.

When a cache miss occurs, a previous pointer value identified for prefetch was "guessed" incorrectly. In an attempt to eliminate the reoccurrence of the cache miss, the requested address must be placed in the pointer field of a line which was recently accessed. This insures that the next time that line is accessed, the requested line, identified in the pointer field, will be prefetched and stored in the cache. Null and Last pointers are used to determine the cache line to store the pointer to the requested line.

If one of the last $2^{C-1}$ lines supplied by the cache contains a Null value in its pointer field, then the line containing the Null pointer will store the address of this line. The address of that line is therefore written to the T2 temporary variable. The requested address will be written over the Null pointer value of that line. Preferably, value of all zeros will be used to identify a Null value, since a memory line should never need to prefetch itself. The Count counter is used to keep track of the number of lines that have been supplied by the cache since the last line with a Null value in the prefetch pointer field. If more than $2^{C-1}$ lines have been supplied, then the Last pointer will be used to identify the line in which the pointer is updated with the requested address. The Last pointer contains the address of the last line (before ReqAddr) supplied by the cache. The address of the last accessed line is therefore written into the T2 temporary variable. The requested address is written into the pointer field of the line in memory pointed to by the T2 temporary variable. The next time this earlier line is accessed by the cache, it will cause the current request address ReqAddr to be prefetched, thus avoiding another cache miss. This sequence establishes and maintains the pointer structure in main memory.

In the present embodiment, the maximum value of the counter is set to $2^{C-1}$, corresponding to half the size of the cache. However, it is contemplated for different applications and/or requirements it may be desirable to specify a larger or smaller maximum count value, for example, a count equal to ¼ of the number of lines in the cache. Alternately, the entire cache is searched for a line containing a Null pointer before utilizing the Last pointer.

Regardless of whether the requested address causes a cache hit or miss to occur, a prefetch of the next line is executed. The memory line at the address identified by the T1 temporary variable is read and placed into the proper line of the cache. If the T1 address is a Null value, the next sequential line after the requested address is prefetched and placed in the cache. The line includes the pointer field and the data field (the optional pointer parity and word parity are also checked at this time). The valid field is set to TRUE. The byte parity for the data field of the cache line is generated. The final step is to update the Last pointer with the requested address. If the pointer field of the line addressed by T1 is Null, the Null pointer is set to T1 and the Count counter is cleared. Otherwise, if the Count counter has not reached $2^{C-1}$, it is incremented.

The write routine in FIG. 11 is considerably simpler than the read routine. The cache is operated using a write-through policy. The write data is placed into a write buffer, and is written back to main memory as soon as possible. If a line that is being written back to memory is also in the cache, the cache line is updated. Alternatively, the line can be invalidated, because it appears to have little impact on performance, and the invalidation policy is simpler to implement.

Word parity is generated for this write data, and is written back at the same time. In the present embodiment, a Null value is written into the pointer field. However, with bit mask write controls (some DRAMs have such controls), or by performing a read-modify-write sequence, it is possible to leave the pointer field unmodified to maintain the pointer information to add some performance gain.

For optimum performance, it is preferred when an application is first loaded into main memory that the pointer fields of all its memory lines be initialized to a Null value. This can be accomplished in hardware if I/O write operations to memory can be distinguished from processor write operations to memory. An I/O write operation will cause the pointer fields to be set to a Null value, preparing the pointer array of the application for execution. Preferably, a processor write operation leaves the pointer field of a memory line unchanged in order to maintain pointer information. If it is not possible to distinguish I/O write operations from processor write operations, then it is preferable to set the pointer field of all memory lines that are written to memory to a Null value (as shown in FIG. 11). Tests show that this does not cause a serious performance loss, and renders the implementation somewhat easier. This function can also be accomplished by a software loader.

Some computer systems distinguish instruction read requests from data read requests. In these systems, there may be an advantage to splitting the cache in two independent caches, one for storage of instructions and one for storage of data. The reason this helps in performance is that the address sequence generated by instruction requests and data requests are independent. If the caches are separated, then the pointer arrays in main memory will also be separated, increasing cache efficiency. The performance of the cache, or caches, can also benefit from traditional cache optimizations. For example, these optimizations include increasing the associativity of the cache to reduce the rate of conflict misses.

In the foregoing discussion, it was assumed that there were a sufficient number of bits available in the pointer field to store an absolute address to any other memory line. If that is not the case, then a relative address can be used. The base value would be the absolute address of the memory line containing the pointer field, and the displacement would be the pointer field interpreted as a two's complement integer.

When a larger line size and more parity bits are used, it may be possible to include two or more independent pointer fields within each memory line. These fields may be of equal or unequal size. One example of the use of multiple pointers is to have a single pointer field containing an address and an independent one bit field which indicates whether the next sequential line is to be prefetched.

As a significant portion of instruction prefetches are to the next sequential memory line and a smaller, but still significant, portion of data prefetches are also to the next sequential line, a single bit pointer provides a simple, effective method for identifying the next sequential line. Therefore, if the next sequential line in memory is to be prefetched, the one bit field would simply indicate this. Alternately, the next sequential line can always be prefetched.

To increase the efficiency of the prefetch process, the prefetching process can be modified slightly so that only one independent prefetch needs to be performed after every request. For example, the sequential bit can be located in the portion of the memory line that is normally returned first. Whenever a prefetch is performed, the memory line is examined as it is received, and if the sequential bit is set, the prefetch is extended to the next line. Once a memory line has been prefetched, the following line can be prefetched with much less overhead than a second independent prefetch. The sequential prefetch can be performed earlier using this implementation, and would otherwise provide for sequential and a non-sequential prefetch after every request, but with only one access to main memory after each request.

With an additional bit, sequential prefetches can be extended to include ascending or descending directions. Using special hardware, the sequential prefetches can be extended to arbitrary stride detection; that is, successive addresses (particularly data addresses) are compared for a constant difference (stride). When constant differences are detected, the prefetching hardware automatically prefetches the next line without an explicit pointer. This process benefits applications that access regular arrays.

An alternative embodiment for performing prefetching is to maintain a number of independent caches, for example, four to sixteen caches. Each cache contains a smaller number of lines, and contains only lines which belong to a certain block of memory. A convenient block size is the page size used for virtual-to-physical mapping (typically 4 kBytes). The pointers needed to prefetch lines within the same block are small (seven bits, assuming a 4 kbyte block and a 32 byte line), permitting a line to have more than one small pointer. Each line in a cache has a small, e.g., seven bit tag and each cache has a larger tag with the remainder of the address, in the present example, 20 bits, assuming 32 address bits and a 4 kbyte block. This alternative embodiment is advantageous because a typical application will have four to eight active request streams at a time; that is, the processor will access four to eight areas of memory during execution.

If the memory block size is chosen to be the same size as the page size, then the small pointers can be generated at compile time by software. This can provide improved prefetching performance than the previously described run-time hardware which creates and maintains the pointer structure. Long pointers (which cross page boundaries) would still need to be created by run-time hardware, since these pointers use physical addresses. Alternatively, the long pointers can be created statically and subsequently adjusted by software when a page is moved around in the physical memory. Although the long pointers become invalid as the virtual-to-physical mapping is changed by the paging system, this happens at a relatively slow rate, and does not impact the performance significantly.

The cache algorithm as described provides for pointer fields to be updated from a Null to a useful value after a cache miss, but the situation where pointer fields with useless values are Nulled has not been discussed. One way to overcome this is to periodically set to a Null value all the pointer fields in the memory. This could benefit compute-bound applications. Other alternatives are also contemplated. For example, counts of erroneous (unused) prefetches due to erroneous pointer values can be maintained and those pointers modified after a certain count is reached.

A key advantage to the cache system of the present invention is the large reduction in the size of the cache. A reduction factor of 128 to 256 is possible. This would permit a system having an integrated level 1, L1, cache to also integrate a prefetching level 2, L2, cache. This second cache could be included in series (between the L1 cache and the interface to main memory), permitting a relatively easy implementation. Alternatively, the second cache could be included in parallel; that is, requests from the processor are checked by both the L1 cache and the prefetching cache for a hit. Although this structure is somewhat more complicated to implement, because it would involve modification to the L1-processor interface, it would result in a significantly higher performance benefit.

In addition to using a portion of the byte parity bits in memory for storage of pointer information, the byte parity bits may also be used for other purposes. One additional purpose is the use of the byte parity bits to hold directory information in a shared memory multiprocessing system.

Such a system would have a single memory space, although the memory components may be in a single central location or distributed. The system includes multiple processing units, each with a private cache. Each processor/cache is able to access any line of information in the memory system. Directory bits ensure that when a processor accesses a line, it receives information about which other processors have a copy of that memory line also. This allows applications executing on the processors to have the illusion that there is a single unified memory system which permits only one access at a time. In fact, the processor/cache units typically execute simultaneously and independently, and only have to coordinate their activities through the directory structure when accessing shared lines.

Typically, the directory information in each line contains a list of all processor/cache units which contain a copy of the line. This is usually impractical for systems with more than a few processors. Alternatively, the directory information in the main memory line points to the first processor/cache with a copy of that line. The line in that cache points to the next processor/cache, and so on, in a linked list structure.

The invention has been described in conjunction with the preferred embodiment. It is evident that numerous alternatives, modifications, variations and uses will be apparent to those skilled in the art in light of the foregoing description.

What is claimed is:

1. A cache memory system comprising:

at least one main memory, said main memory comprising lines of data located at specified addresses, said main memory maintaining a prefetch pointer field associated with each line of data;

at least one cache coupled to main memory, said cache storing a plurality of lines of data and associated prefetch pointer fields;

a memory access control means coupled to receive a request for data from a requesting device located at a predetermined address and further coupled to the main memory and cache, said means comprising;

means for accessing the cache to determine if the requested data is located in a line of data in the cache, and if the data is located in the cache, causing the data requested to be returned to the requesting device, and means for accessing main memory to cause the requested data to be returned to the requesting device if the data is not located in the cache, said means further causing the line in main memory containing the requested data and the associated prefetch pointer field to be written to the cache; and cache prefetch means comprising;

means for reading a prefetch pointer from the prefetch pointer field of the line in the cache containing the data requested, and means for accessing the line of data in main memory pointed to by the prefetch pointer which is read and storing the line of data and the associated prefetch pointer in the cache;

wherein a line of data is prefetched and placed in the cache in accordance with the prefetch pointer associated with the line of data requested, thereby decreasing the probability of a cache miss occurring when a subsequent request is issued.

2. The cache memory system as set forth in claim 1, wherein the prefetch pointer comprises the address of a line of data in main memory which is likely to be requested for access subsequent to the line of data associated with the prefetch pointer.

3. The cache memory system as set forth in claim 1, wherein the prefetch pointer comprises a relative address of a line of data in main memory which is likely to be requested for access subsequent to the line of data associated with the prefetch pointer, said relative address relative to the address of the line of data associated with the prefetch pointer.

4. The cache memory system as set forth in claim 1, wherein if said prefetch pointer comprises a Null value, said means for accessing the line of data in main memory accesses the next sequential line of memory.

5. The cache memory system as set forth in claim 1, wherein a prefetch pointer comprises a Null value when the line of data associated with the prefetch pointer is initially stored in main memory.

6. The cache memory system as set forth in claim 5, wherein a prefetch pointer associated with a line in main memory is updated in the cache from a Null value to a pointer to a line of data subsequently accessed.

7. The cache memory system as set forth in claim 1, wherein a prefetch pointer associated with a line in main memory is unmodified when the line of data is written to main memory.

8. The cache memory system as set forth in claim 7, further comprising a bit mask to mask the prefetch pointer field in main memory such that when a line of data is written to main memory the associated prefetch pointer field is unmodified.

9. The cache memory system as set forth in claim 7, wherein the associated prefetch pointer field is unmodified by performing a read-modify-write sequence to perform the write operation to main memory.

10. The cache memory system as set forth in claim 1, wherein an associated prefetch pointer comprises a Null value when a line of data is stored in main memory by an input/output device and the associated prefetch pointer is unmodified in main memory when a line of data is written by a processor device.

11. The cache memory system as set forth in claim 1, wherein the cache memory system comprises a first level cache coupled to the requesting device and main memory and a prefetching second level cache coupled to the requesting device and main memory, said second level cache operating in parallel with the first level cache between the requesting device and main memory.

12. The cache memory system as set forth in claim 1, wherein the cache memory system comprises a first level cache coupled to the requesting device and main memory and a prefetching second level cache coupled to the first level cache and main memory, said second level cache operating in series between the first level cache and main memory.

13. The cache memory system as set forth in claim 1, wherein the prefetch pointer is stored in parity fields located in the line of data.

14. The cache memory system as set forth in claim 13, wherein error detection and correction (EDC) information is further stored in the parity fields located in the line of data.

15. The cache memory system as set forth in claim 1, wherein the prefetch pointer is stored in a region of main memory separate from the line of data with which the prefetch pointer is associated.

16. The cache memory system as set forth in claim 1, comprising an instruction cache for storing lines of data comprising instructions and a data cache for storing lines of data comprising other information requested, each cache maintaining independent prefetch pointers.

17. The cache memory system as set forth in claim 1, wherein the cache is a direct mapped cache.

18. The cache memory system as set forth in claim 1, wherein the cache is an associative cache.

19. The cache memory system as set forth in claim 1, wherein the prefetch pointer field comprises a plurality of pointers.

20. The cache memory system as set forth in claim 19, wherein the prefetch pointer field comprises a first prefetch pointer pointing to a line of memory to prefetch and a second prefetch pointer comprising a bit, if when set, indicates that the next sequential line is to be prefetched.

21. The cache memory system as set forth in claim 20, wherein if the second prefetch pointer of a line is set, said means for accessing main memory causes the next sequential line in main memory and the associated prefetch pointer field to be written to the cache.

22. The cache memory system as set forth in claim 1, further comprising means for detecting patterns of accesses to main memory, said means for prefetching prefetching a line of data from main memory in accordance with the patterns detected.

23. The cache memory system as set forth in claim 1, comprising a plurality of independent caches, each cache containing, at any point in time, lines from a single block of memory.

24. The cache memory system as set forth in claim 23, wherein a memory block comprises a memory page in a virtual memory system.

25. The cache memory system as set forth in claim 1, wherein the system comprises a plurality of devices issuing requests for access to a line of the memory to the memory access control means, said memory comprising a shared memory, and parity fields located in each line of data are used to store a directory information identifying devices of the plurality of device that have a copy of the line stored in caches associated with the identified devices.

26. In a cache memory system comprising at least one main memory, said main memory comprising lines of data located at specified addresses, and at least one cache coupled to main memory, said cache storing a plurality of lines of data, wherein requests for access to data identified by an address are issued, a method for prefetching lines of data from main memory for placement in the cache, said method comprising the steps of:

associating a prefetch pointer field comprising at least one prefetch pointer with each line of data, each of said prefetch pointers pointing to a line in main memory which may be requested for access subsequent to the line associated with the prefetch pointer;

prefetching a line of data from main memory and placing the line of data and the associated prefetch pointer in the cache, said line of data prefetch being the line pointed to by the prefetch pointer associated with line of data requested for access;

wherein the frequency of cache misses are decreased.

27. The method as set forth in claim 26, wherein the step of associating a prefetch pointer field comprises the step of utilizing at least a portion of parity fields of the line of data to store the prefetch pointer field.

28. The method as set forth in claim 27, wherein the step of associating a prefetch pointer field comprises the step of utilizing at least a portion of parity fields of the line of data to further store EDC information.

29. The method as set forth in claim 26, wherein the step of associating a prefetch pointer field comprises the step of storing the prefetch pointer in a region of main memory separate from the line of data with which the prefetch pointer is associated.

30. The method as set forth in claim 26, wherein said step of associating a prefetch pointer field comprises storing a plurality of prefetch pointers.

31. The method as set forth in claim 30, wherein the plurality of prefetch pointers comprises a first prefetch pointer pointing to a line of memory to prefetch and a second prefetch pointer comprising a bit, if when set, indicates that the next sequential line is to be prefetched.

32. The method as set forth in claim 31, wherein said step of prefetching a first line of data from main memory further comprises the step of prefetching the next sequential line and placing that line in the cache if the second prefetch pointer bit is set in the first line.

33. The method as set forth in claim 26, further comprising the steps of:

detecting patterns of accesses to main memory; and prefetching a line of data from main memory in accordance with the patterns detected.

34. The method as set forth in claim 26, further comprising the step of statically generating an initial set of prefetch pointers prior to said step of prefetching.

35. The method as set forth in claim 34, wherein virtual memory is utilized, said method further comprising the step of associating an independent cache with each currently accessed page in memory; said step of associating a prefetch pointer field comprising prefetch pointers to lines of data within the same page.

36. The method as set forth in claim 34, wherein virtual memory is utilized, and said method further comprises the step of adjusting the prefetch pointers when a page of memory is moved within physical memory such that corresponding prefetch pointers continue to point to a line of data after the page of memory is moved.

37. The method as set forth in claim 26, wherein the step of associating a prefetch pointer field comprises the steps of:

initializing the prefetch pointer fields of lines in main memory to a Null value;

when a cache miss occurs when a line of data is not located in the cache when requested, updating the prefetch pointer field of a recently accessed line in the main memory having a prefetch pointer field containing a Null value with the pointer to the line requested.

38. The method as set forth in claim 37, wherein if the prefetch pointer fields of recently accessed lines of data in the main memory do not contain a Null value, updating the prefetch pointer field of a prior requested line.

39. The method as set forth in claim 26, further comprising the step of periodically setting prefetch pointer fields to Null values in order to eliminate stale pointers.

40. The method as set forth in claim 26, wherein the step of prefetching further comprises the step of prefetching the next sequential line of memory if the prefetch pointer of the line requested for access comprises a Null value.

41. The method as set forth in claim 26, further comprising the steps of:

writing data to a line in main memory; and setting the prefetch pointer field of the line written to a Null value.

42. The method as set forth in claim 26, further comprising the step of writing data to a line in main memory such that the existing prefetch pointer value of the line is maintained.

43. The method as set forth in claim 42, wherein the step of writing data further comprises the step of masking the prefetch pointer field such that the existing prefetch pointer value is maintained.

44. The method as set forth in claim 42, wherein the step of writing data comprises the step of performing a read-modify-write operation such that the existing prefetch pointer value is maintained.

45. The method as set forth in claim 26, further comprising the steps of:

writing data to a line in main memory and setting the prefetch pointer field of the line written to a Null value if the data is written from an input/output device; and writing data to a line in main memory such that the existing prefetch pointer value of the line is maintained if data is written from a processor.

46. The method as set forth in claim 26, wherein the step of associating a prefetch pointer field further comprises the steps of:

providing a Null pointer which points to the last recently accessed line in the main memory requested that contains a Null pointer value;

providing a Last pointer which points to the last line in the main memory requested;

if a cache hit occurs and the requested line is located in the cache, updating the Last pointer to point to the requested line and if the prefetch pointer value of the requested line contains a Null value, updating the Null pointer to point to the requested line;

if a cache miss occurs and a prefetch pointer field of a line in the main memory as pointed to by the Null pointer exists, updating the prefetch pointer value of the line to point to the requested line, and if a Null prefetch pointer value does not exist, updating the prefetch pointer value of the last line pointed to by the Last pointer to point to the requested line.

47. The method as set forth in claim 26, further comprising the step of storing a directory information in parity fields of each line to assist in maintaining consistency is a multiple processor system.

48. A processing system comprising:

at least one main memory, said main memory comprising lines of data located at specified addresses, said main memory maintaining a prefetch pointer associated with each line of data;

at least one cache coupled to main memory, said cache storing a plurality of lines of data and associated prefetch pointer fields;

a processor coupled to the cache and the main memory, said processor issuing a request for access to data at a specified address;

a cache controller coupled to receive the request for data and further coupled to the main memory and cache, said cache controller determining if the requested data is located in a line of data in the cache, and if the data is located in the cache, causing the data requested to be returned to the processor, and if the data is not located in the cache, said cache controller communicating a cache miss signal to the main memory causing the line in main memory containing the requested data and the associated prefetch pointer field to be written to the cache and the requested data returned to the processor, said cache controller further reading the prefetch pointer of the line containing the data requested, and copying the line of data in main memory pointed to by the prefetch pointer field read and storing the line of data and the associated prefetch pointer in the cache;

wherein a line of data is prefetched and placed in the cache in accordance with the prefetch pointer associated with the line of data requested, thereby decreasing the probability of a cache miss occurring when a subsequent request is issued.

49. The processing system as set forth in claim 48, wherein the prefetch pointer comprises the address of a line of data in main memory which is likely to be requested for access subsequent to the line of data associated with the prefetch pointer.

50. The processing system as set forth in claim 48, wherein the prefetch pointer is stored in parity fields located in the line of data.

51. The processing system as set forth in claim 50, wherein error detection and correction (EDC) information is further stored in the parity fields located in the line of data.

52. The processing system as set forth in claim 48, wherein the prefetch pointer is stored in a region of main memory separate from the line of data with which the prefetch pointer is associated.

53. The processing system as set forth in claim 48, wherein a prefetch pointer comprises a Null value when the line of data associated with the prefetch pointer is initially stored in main memory.

54. The processing system as set forth in claim 53, wherein a prefetch pointer associated with a line in main memory is updated from a Null value to a pointer to a line of data subsequently accessed.

55. The processing system as set forth in claim 48, wherein a prefetch pointer associated with a line in main memory is unmodified when a line of data is written to main memory.

56. The processing system as set forth in claim 55, further comprising a bit mask to mask the prefetch pointer field in main memory such that when a line of data is written to main memory the associated prefetch pointer field is unmodified.

57. The processing system as set forth in claim 55, wherein the associated prefetch pointer field is unmodified by performing a read-modify-write sequence to perform the write operation to main memory.

58. The processing system as set forth in claim 48, wherein an associated prefetch pointer comprises a Null value when a line of data is stored in main memory by an input/output device and the associated prefetch pointer is unmodified in main memory when a line of data is written by the processor.

59. The processing system as set forth in claim 48, wherein if the prefetch pointer comprises a Null value, said cache controller causing the next sequential line in memory to be prefetched.

60. The processing system as set forth in claim 48, wherein the cache memory system comprises a first level cache coupled to the requesting device and main memory and a prefetching second level cache coupled to the requesting device and main memory, said second level cache operating in parallel with the first level cache between the processor and main memory.

61. The processing system as set forth in claim 48, wherein the cache memory system comprises a first level cache coupled to the requesting device and main memory and a prefetching second level cache coupled to the first level cache and main memory, said second level cache operating in series between the first level cache and main memory.

62. The processing system as set forth in claim 48, comprising an instruction cache for storing lines of data comprising instructions and a data cache for storing lines of data comprising other information requested, each cache maintaining independent prefetch pointers.

63. The processing system as set forth in claim 48, wherein the cache is a direct mapped cache.

64. The processing system as set forth in claim 48, wherein the cache is an associative cache.

65. The processing system as set forth in claim 48, wherein the prefetch pointer field comprises a plurality of pointers.

66. The processing system as set forth in claim 65, wherein the prefetch pointer field comprises a first prefetch pointer pointing to a line of memory to prefetch and a second prefetch pointer comprising a bit, if when set, indicates that the next sequential line is to be prefetched.

67. The processing system as set forth in claim 65, wherein if the second prefetch pointer of a line is set, said means for accessing main memory causing the next sequential line in main memory and the associated prefetch pointer field to be written to the cache.

68. The processing system as set forth in claim 48, further comprising means for detecting patterns of accesses to main memory, said means for prefetching prefetching a line of data from main memory in accordance with the pattern detected.

69. The cache memory system as set forth in claim 48, comprising a plurality of independent caches, each cache containing, at any point in time, lines from a single block of memory.

70. The processing system as set forth in claim 69, wherein a memory block comprises a memory page in a virtual memory system.

71. The processing system as set forth in claim 48, wherein the system comprises a plurality of devices issuing requests and parity fields located in each line of data are used to store directory information.

72. A cache memory system comprising:

at least one main memory, said main memory comprising lines of data located at specified addresses, each line of data further comprising an associated prefetch pointer field;

at least one cache coupled to main memory, said cache storing a plurality of lines of data and maintaining a prefetch pointer field associated with each line of data;

a memory access controller coupled to receive a request for data at a predetermined address from a requesting device and further coupled to the main memory and cache, said means comprising;

means for accessing the cache to determine if the requested data is located in a line of data in the cache, and if the data is located in the cache, causing the data requested to be returned to the requesting device, and means for accessing main memory to cause the requested data to be returned to the requesting device if the data is not located in the cache, said means further causing the line in main memory containing the requested data and the associated prefetch pointer field to be written to the cache;

if the data is not located in the cache, means for providing a prefetch pointer to the line of memory accessed from main memory and storing in the prefetch pointer field in a previous accessed line of data in the cache; and cache prefetch means comprising;

means for reading a prefetch pointer from the prefetch pointer field of the line in the cache containing the data requested, and means for accessing the line of data in main memory pointed to by the prefetch pointer read and storing the line of data and the associated prefetch pointer in the cache if the line of data pointed to by the prefetch pointer read is not located in the cache;

wherein a line of data is prefetched and placed in the cache in accordance with the prefetch pointer associated with the line of data requested, thereby decreasing the probability of a cache miss occurring when a subsequent request is issued.

73. The cache memory system as set forth in claim 72, wherein if said prefetch pointer comprises a Null value, said means for accessing the line of data in main memory access the next sequential line of memory.

74. The cache memory system as set forth in claim 72, wherein the prefetch pointer is stored in parity fields located in the line of data.

75. The cache memory system as set forth in claim 72, wherein the prefetch pointer field comprises a plurality of pointers.

76. The cache memory system as set forth in claim 75, wherein the prefetch pointer field comprises a first prefetch pointer identifying an address of a line of memory to prefetch and a second prefetch pointer comprising a bit, if when set, indicates that a line of data at a next sequential address is to be prefetched.

77. In a cache memory system comprising at least one main memory, said main memory comprising lines of data located at specified addresses, and at least one cache coupled to main memory, said cache storing a plurality of lines of data, wherein requests for access to data identified by an address are issued, a method for prefetching lines of data from main memory for placement in the cache, said method comprising the steps of:

associating a prefetch pointer field comprising at least one prefetch pointer with each line of data in the cache, each of said prefetch pointers pointing to a line in main memory which may be requested for access subsequent to the line in the cache associated with the prefetch pointer;

associating a prefetch pointer field comprising at least one prefetch pointer with each line of data in main memory, such that main memory maintains prefetch pointer information when a line of data is no longer in the cache;

prefetching a line of data and associated prefetch pointer field from main memory and placing the line of data in the cache if the line of data pointed to by the prefetch pointer read is not located in the cache, said line of data prefetch being the line pointed to by the prefetch pointer associated with line of data requested for access;

wherein the frequency of cache misses are decreased.

78. The method as set forth in claim 77, wherein the steps of associating a prefetch pointer field each comprises the step of utilizing at least a portion of parity fields of the line of data to store the prefetch pointer field.

79. The method as set forth in claim 77, wherein said steps of associating a prefetch pointer field each comprising storing a plurality of prefetch pointers.

80. The method as set forth in claim 79, wherein the plurality of prefetch pointers comprises a first prefetch pointer pointing to a line of main memory to prefetch and a second prefetch pointer comprising a bit, if when set, indicates that the next sequential line of memory is to be prefetched.

* * * * *